United States Patent [19]

Saria et al.

[11] Patent Number: 5,557,102
[45] Date of Patent: Sep. 17, 1996

[54] TESTING APPARATUS FOR THE CALIBRATION OF OVERHEATING AND RAIL BRAKE LOCATING DEVICES

[75] Inventors: Othmar Saria, Zeltweg, Austria; Karl H. Schmall, Baden-Baden, Germany

[73] Assignee: VAE Aktiengesellschaft, Vienna, Austria

[21] Appl. No.: 397,692

[22] Filed: Mar. 2, 1995

[30] Foreign Application Priority Data

Mar. 2, 1994 [AT] Austria ........................................ 449/94

[51] Int. Cl.[6] ........................................ G01D 18/00
[52] U.S. Cl. ........................................ 250/252.1; 250/342
[58] Field of Search ........................... 250/252.1 A, 342; 246/169 A, 169 D

[56] References Cited

U.S. PATENT DOCUMENTS 5,060,890  10/1991  Utterback et al. .................. 250/342 X
5,100,243   3/1992  Grosskopf et al. .......................... 374/2
5,311,273   5/1994  Tank et al. ....................... 250/252.1 A X
5,471,055  11/1995  Costanzo et al. .................. 250/252.1 A

FOREIGN PATENT DOCUMENTS 3639541  10/1987  Germany .......................... 250/252.1 A Primary Examiner—Carolyn E. Fields
Assistant Examiner—Edward J. Glick
Attorney, Agent, or Firm—Cushman Darby & Cushman

[57] ABSTRACT

A testing apparatus for the calibration of overheating or rail brake locating devices comprises an IR emitter which is guided in a housing so that it can shift along a curved track to exhibit an appropriately adapted beaming direction in a particular position. An extension piece for the track is provided for further changing the beaming direction.

9 Claims, 3 Drawing Sheets

TESTING APPARATUS FOR THE CALIBRATION OF OVERHEATING AND RAIL BRAKE LOCATING DEVICES

The invention is relates to a testing apparatus for the calibration of overheating and rail brake locating devices with an IR emitter which can be positioned relative to the apparatus to be tested.

BACKGROUND OF THE INVENTION

Stationary overheating devices and rail brake locating devices in railway installations should be checked according to the pertinent regulations at certain time intervals as to their proper operation. At the present time infrared transmitters are used for such a checking which are designed as a heating rod or heating plate and are attached in the immediate vicinity of the wheel set. The infrared transmitters are actuated as required via a current source. The operation control is subject to a series of disturbance factors and, in particular, to distortions by air currents, and the measuring apparatus itself can only be calibrated with difficulty by being placed directly on the wheel set. A further stationary infrared testing apparatus is currently mounted onto the overheating locating device so that there is a corresponding radiation of the heating plate. Only the overheating locating device or the rail brake locating device can be checked with such an apparatus since the testing apparatus must be repositioned in each instance for different beam angles. Moreover, the known apparatuses exhibit a relatively great overall height so that testing is possible only during train stops.

The invention has the objective of further developing a testing apparatus of the initially mentioned type in such a manner that several operations and different geometries of overheating locating devices and of rail brake locating devices can be reliably detected with a single apparatus. Furthermore, the invention has the objective of making it possible to test during travel and, in addition, making automatic readjusting possible by also using the rail electronics and the evaluation electronics of the overheating locating device and of the rail brake locating device.

SUMMARY OF THE INVENTION

In order to solve this problem the design of the testing apparatus of the invention is essentially characterized in that the bearing for at least one IR emitter is shiftably located in a housing and can be fixed in a particular shifted position. As a result of the fact that the IR emitter is shiftably mounted in a housing and can be fixed in a particular shifted position, a simple satisfactory construction design is created having an extremely low overall height and, nevertheless, wherein different positions and different beam angles can be reliably detected with one and the same apparatus. In an especially advantageous manner the housing is designed to be flat and extended longitudinally in the direction of the shifting of the emitter, and it is particularly advantageous if the housing of the testing apparatus is connected in a detachable manner, especially by magnets, to the apparatus to be tested. In this manner a testing apparatus with such a reduced overall height is created such that no part of the testing apparatus extends, after the mounting to the overheating locating device, in any portion into the structural clearance which is to be kept free as set by the railroad administration. This makes a testing during travel possible.

In order to assure a reliable positioning of the IR emitter, it is advantageous if the design is such that the IR emitter can shift and pivot along a curved track and if an actuating knob for the shifting movement passes through the housing cover of the testing apparatus. An especially simple construction design is achieved in that the actuating knob for shifting the IR emitter is designed as an adjusting screw and at the same time the particular position of the IR emitter can be blocked and reliably retained even in the case of vibrations during travel. Such a radiating body guided in guides, e.g. guide slots, is positioned in the particular testing positions with a precisely given beam angle and is fixed in its position.

The design is achieved hereby in an especially simple constructive manner so that the IR emitter is connected to a power circuit for the adjustment of the temperature of the emitter and that the power circuit is connected to the evaluation circuit of the apparatus to be tested, which creates the possibility of achieving a totally automatic adjusting of the device. The temperatures can be preselected in such a design via the testing software, whereupon the radiating body is heated up and the measured values detected by the scanner or the measured-value receiver of the overheating and rail brake locating devices are passed on to the rail electronics. A certain temperature detected in this manner corresponds to a voltage amplitude of the overheating locating device. A readjustment of the scanner can take place by means of a set/actual comparison, during which appropriate messages can be passed on. In the case of relatively slight deviations in the measuring range, the calibration and the compensation can take place by the software, and a software readjustment of the overheating locating device can take place. Initially, a disturbance signal is only passed on to a central location upon rather large deviations so that the scanner thereafter must be checked in detail.

It is just as possible to carry out a first adjustment of the overheating locating device with such a testing apparatus since certain voltage values can be assigned to the scanner when passing through a certain temperature range with the testing apparatus. This assignment of certain voltage values permits the calibration to be performed in an exact manner over a wide temperature range.

A construction which is especially simple mechanically and stable, especially for the testing of a certain, known overheating and rail brake locating devices, is characterized in that the particular end positions of the shifting position of the IR emitter are connected to stops, in particular by elastic buffers. In such a design the two testing positions can be set in a simple manner by shifting the IR emitters to the particular stop positions. For an adaptation of such a testing apparatus to different overheating and rail brake locating devices, the design is advantageously such that the curved track and the stops in the testing apparatus are adjustably arranged.

In order to do justice to the geometry, which is different in rail brake locating devices from the geometry of overheating locating devices, and in particular to also be able to detect horizontal beam angles with the testing apparatus, the design is advantageously such that a further bearing for an IR emitter is connected via an extension piece to the bearing guided in the curved track. The advantages of movability, and therewith of an exact adjustability, are also preserved for this arrangement.

As a result of the far-reaching movability of the setting of the emitter, the testing apparatus can be used for various applications of the overheating locating device and of the rail brake locating device. Due to the quite flat construction, it is no longer necessary to monitor the train travel itself and influencing factors can be detected which can be given by a passing train for the overheating locating device which is to be checked. The calibration thus detects, in distinction to known devices, the possible influence of the rolling train on the given calibration, and checking during travel is made possible in that when the testing apparatus is mounted, its upper edge is located below or outside of the given safety distance for a rolling train.

BRIEF DESCRIPTION OF THE DRAWINGS

The invention is explained in detail herein after using an embodiment schematically shown in the drawings.

DETAILED DESCRIPTION OF THE DRAWINGS

Figure 1:
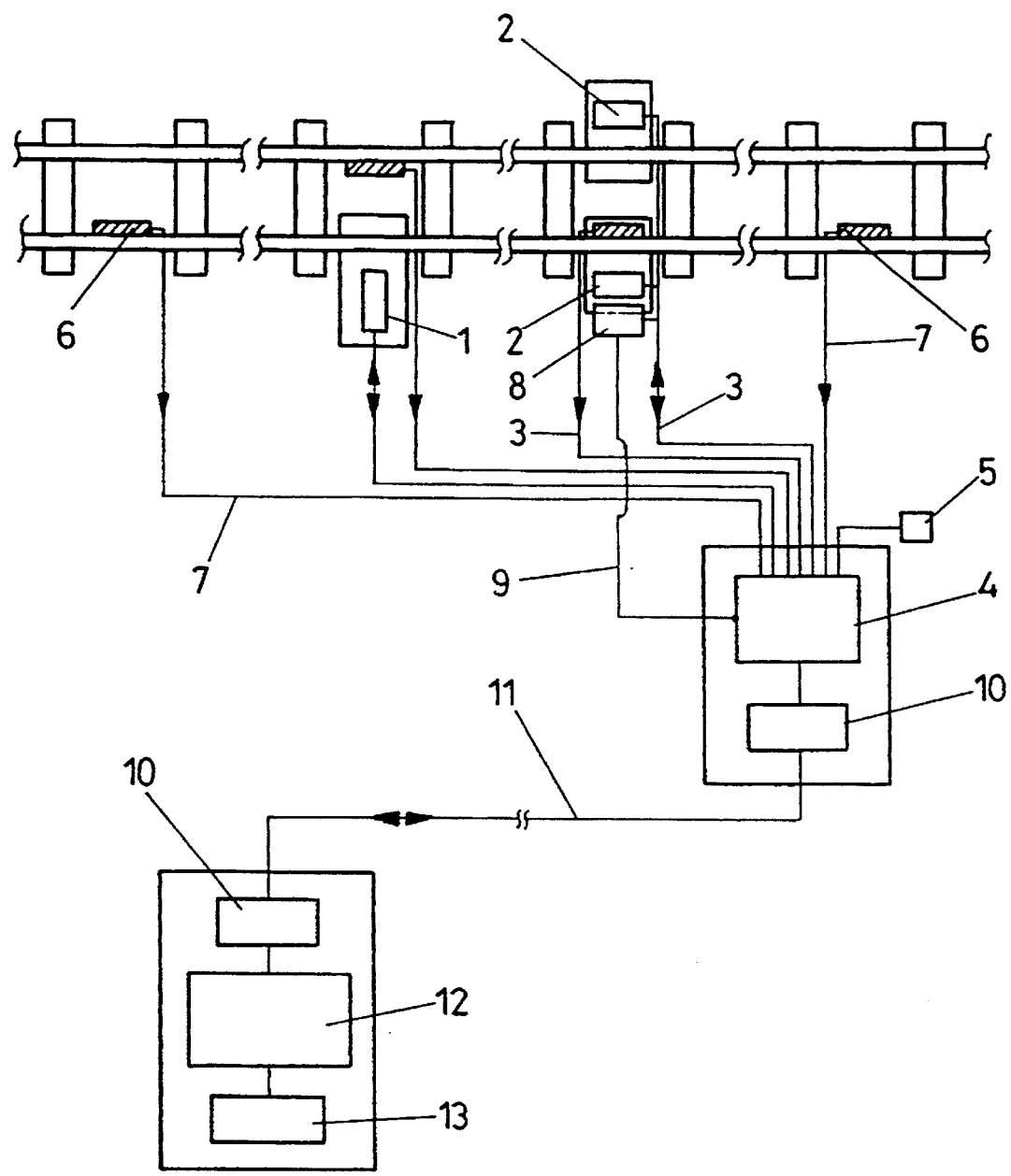
FIG. 1 shows a schematic arrangement of an overheating locating device or rail brake locating device on a rail as well as showing the associated control electronics such as is also used in conjunction with the testing apparatus.

In FIG. 1, a rail brake locating device is schematically indicated as 1. The overheating locating devices are arranged on both sides of the rolling stock and are designated in each instance as 2. The signals of overheating locating devices 2 are connected via signal leads 3 to rail electronics 4. An external temperature sensor 5 is provided, and rail contacts 6 are arranged whose signals are passed via signal leads 7 to the rail electronics.

The testing apparatus is schematically indicated as 8 and is connected via signal leads 9 to the rail electronics. Messages of the rail electronics are passed via modem 10 and data remote transfer leads 11 to a control room in which, again, a modem 10 and a display and operating unit 12, as well as an optional printer 13, are present.

Figure 2:
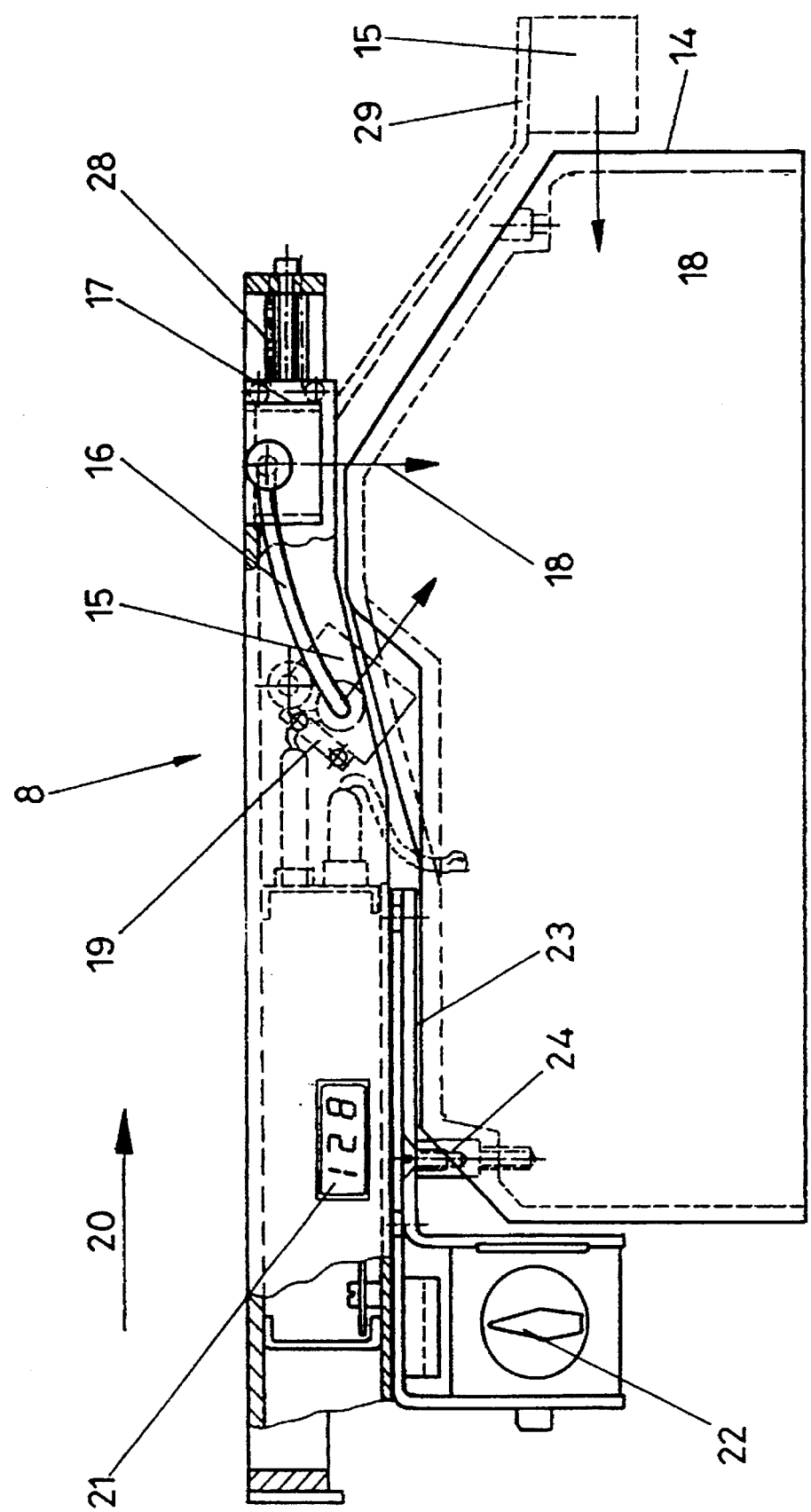
FIG. 2 shows a lateral view of the testing apparatus in accordance with the invention in partial section.

FIG. 2 shows in what manner testing apparatus 8 is oriented relative to housing 14 of an overheating or rail brake locating device. IR emitter 15 can shift along curved track 16 between two end positions; the end position for the detection of a vertical beam is defined by elastic stop 17. In this end position at stop 17 the IR emitter radiates in the direction of arrow 18 below an angle of 90° onto the scanner cells and detector cells and thus an overheating locating device can be checked in this manner. In the second end position, in which a beam angle of IR emitter 15 of approximately 50° is assumed and this angle is limited by stop 19, an overheating locating device can be monitored with a differing beam angle. For checking a rail brake locating device an IR emitter is shiftably guided with extension piece 29 on the curved track and a beam angle of 0° to approximately 40° is covered. The housing of the testing apparatus is quite flat, and IR emitter 15 can shift in the longitudinal direction of the housing schematically indicated by arrow 20. As a result of this ability to shift in a longitudinal direction, only a relatively low overall height is necessary, and the power electronics, as well as an optional indicator panel 21, can be arranged on a part of the testing apparatus which extends downward over housing 14 of the overheating locating device. Furthermore, FIG. 2 shows a switch 22 for the actuation of magnets by means of which the housing of testing apparatus 8 can be fixed to a steel plate 23 of housing 14 of the overheating locating device. In order to assure a correct positioning, spacers 24 can be provided into which steel pins can also fit for an exact positioning.

Figure 3:
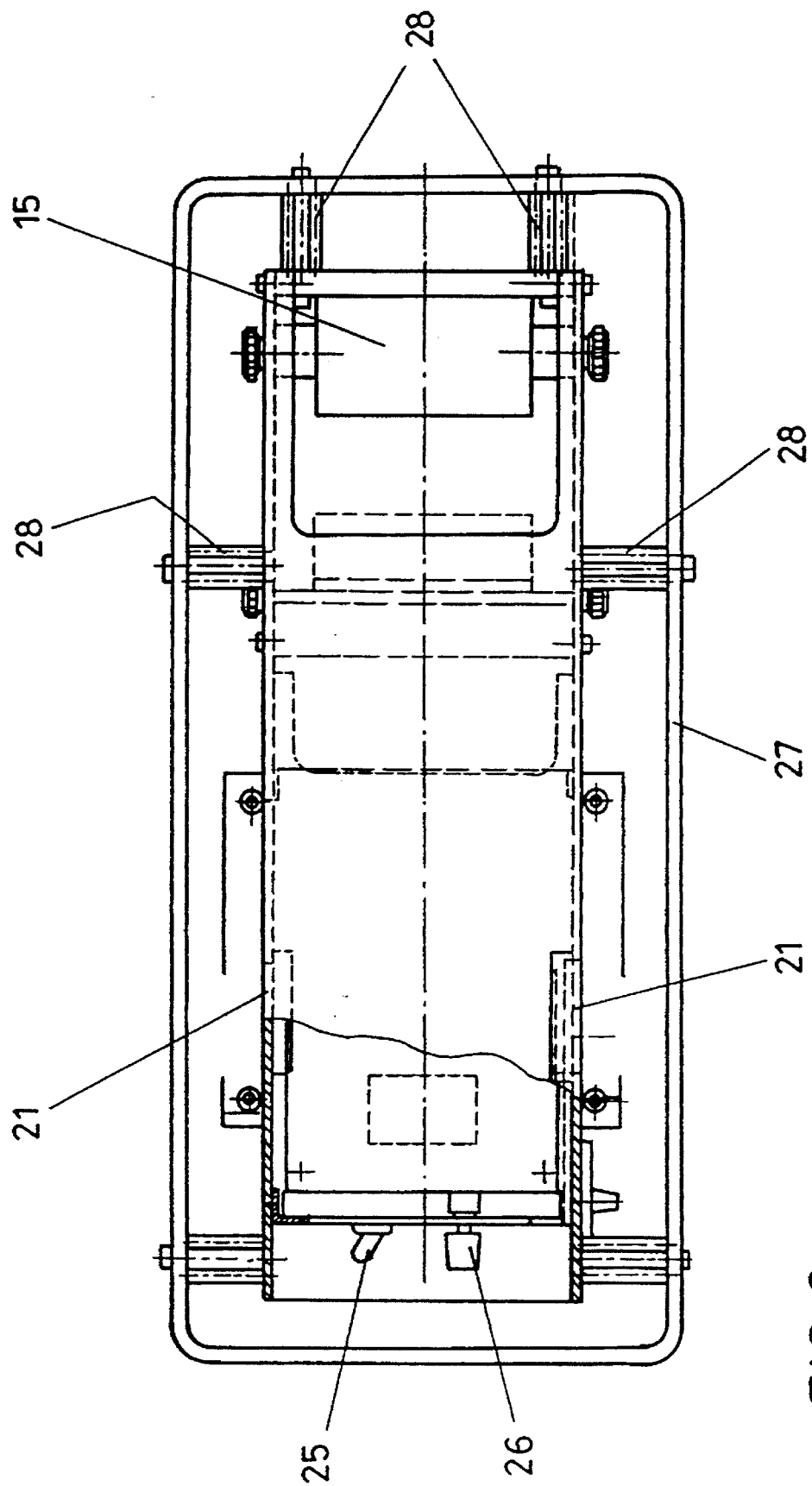
FIG. 3 shows a top view of the view of FIG. 2.

In FIG. 3 rubber buffers 28 for connecting the housing of the testing apparatus to surrounding frame 27 can be seen. In the design shown in detail, a change-over switch 25 for switching display 21 on the left or the right side of the apparatus is visible. Finally, push-button switch 26 is provided for resetting the apparatus. This surrounding frame 27 serves to increase the stability and simplify transport and especially, to protect the testing apparatus.

What is claimed is:

1. A testing apparatus for the calibration of overheating and rail brake locating devices, comprising:
   a housing containing a curved track:
   means for selectably positioning an IR emitter along said track to adjust the position of said emitter with respect to a device being tested; and
   means for fixing said emitter at a selected position on said track.

2. A testing apparatus according to claim 1, wherein the housing is detachably magnetically connected to the device being tested.

3. A testing apparatus according to claim 1 or 2, wherein the housing is flat and longitudinally extended in the direction of the positioning of the emitter.

4. A testing apparatus according to claim 1 or 2, wherein the IR emitter is connected to a power circuit for the adjustment of the temperature of the emitter, the power circuit being connected to an evaluation circuit of the device being tested.

5. A testing apparatus according to claim 1 or 2, wherein at end positions in the positioning of the IR emitter elastic buffer stops are provided.

6. A testing apparatus according to claim 1 or 2, wherein when the testing apparatus is operatively positioned with respect to said device being tested, the housing is located a predetermined safe distance from a rolling train.

7. A testing apparatus according to claim 1 or 2, further comprising an extension piece joined to said curved track, said piece being adapted to receive and position an IR emitter with respect to said device being tested.

8. A testing apparatus according to claim 1, wherein the means for positioning the IR emitter is an adjusting screw.

9. A testing apparatus according to claim 1, wherein the curved track is provided with adjustably arranged stops.

* * * * *